(12) United States Patent
Boyd

(10) Patent No.: US 9,657,872 B2
(45) Date of Patent: May 23, 2017

(54) PIPELINE UNIT

(71) Applicant: Heerema Marine Contractors Nederland SE, Leiden (NL)

(72) Inventor: Helen Rose Boyd, Leiden (NL)

(73) Assignee: Heerema Marine Contractors Nederland SE, Leiden (NL)

( * ) Notice: Subject to any disclaimer, the term of this patent is extended or adjusted under 35 U.S.C. 154(b) by 244 days.

(21) Appl. No.: 14/354,846

(22) PCT Filed: Oct. 31, 2012

(86) PCT No.: PCT/NL2012/050756
§ 371 (c)(1),
(2) Date: Apr. 28, 2014

(87) PCT Pub. No.: WO2013/066170
PCT Pub. Date: May 10, 2013

(65) Prior Publication Data
US 2014/0306445 A1    Oct. 16, 2014

Related U.S. Application Data

(60) Provisional application No. 61/553,563, filed on Oct. 31, 2011, provisional application No. 61/565,104, filed on Nov. 30, 2011.

(30) Foreign Application Priority Data

Nov. 1, 2011  (NL) ..................................... 2007693

(51) Int. Cl.
*F16L 13/00*   (2006.01)
*F16L 13/02*   (2006.01)
(Continued)

(52) U.S. Cl.
CPC ......... *F16L 13/0272* (2013.01); *F16L 58/181* (2013.01); *F16L 59/20* (2013.01)

(58) Field of Classification Search
USPC .................................. 285/285.1, 55, 47, 45
See application file for complete search history.

(56) References Cited

U.S. PATENT DOCUMENTS 3,535,136 A * 10/1970 Beene .................... F16L 15/008
                                                        118/504
3,558,799 A *  1/1971 Lee .......................... H01R 4/10
                                                        174/73.1
(Continued)

FOREIGN PATENT DOCUMENTS

EP        0220122     4/1987
GB        2130522     6/1984
(Continued)

OTHER PUBLICATIONS

Search Report and Written Opinion dated Jan. 2, 2013 for International Application No. PCT/NL2012/050756.
(Continued)

*Primary Examiner* — Aaron Dunwoody
(74) *Attorney, Agent, or Firm* — Patterson & Sheridan, L.L.P.

(57) ABSTRACT

The ends of two pipeline units are joined together at a pipe joint. Each pipeline unit has a pipe member and a pipe coating surrounding the pipe member. The pipe coating extends along a length of the pipe member. A joint coating surrounds the pipe joint and is made from a material comprising a silicone.

8 Claims, 12 Drawing Sheets

Figure 1:
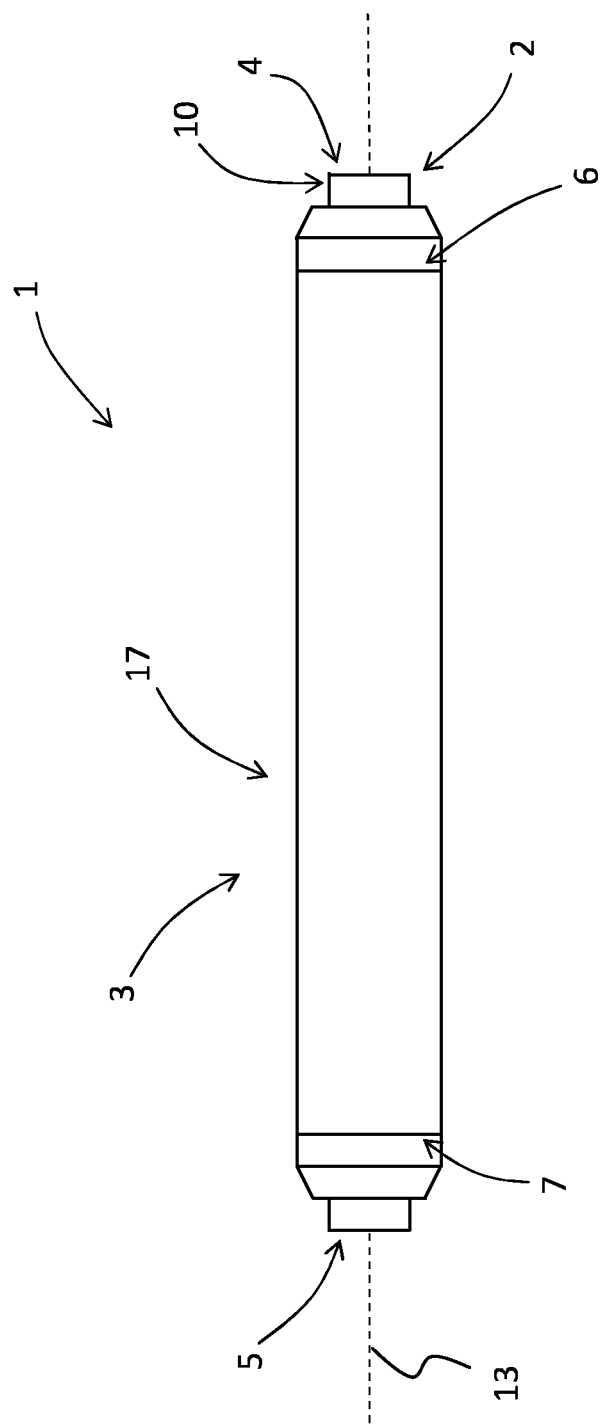

(51) Int. Cl.
*F16L 58/18* (2006.01)
*F16L 59/20* (2006.01)

(56) References Cited

U.S. PATENT DOCUMENTS

| | | | | | |
|---|---|---|---|---|---|
| 3,711,124 | A | * | 1/1973 | Gerholt | F16L 59/028 285/351 |
| 3,884,512 | A | * | 5/1975 | Wesch | E21B 17/00 166/242.1 |
| 3,989,281 | A | * | 11/1976 | Wilde, Jr. | F16L 13/0272 174/84 R |
| 4,019,761 | A | * | 4/1977 | Heidemann | F16L 59/20 285/288.11 |
| 4,557,507 | A | * | 12/1985 | Commandeur | F16L 27/12 277/627 |
| 4,635,967 | A | * | 1/1987 | Stephenson | E21B 17/08 285/334.2 |
| 4,660,861 | A | * | 4/1987 | Argy | F16L 59/029 138/149 |
| 4,732,412 | A | * | 3/1988 | van der Linden | B29C 61/0616 138/99 |
| 4,818,148 | A | * | 4/1989 | Takeda | E02D 5/60 405/216 |
| 4,830,060 | A | * | 5/1989 | Botsolas | F16L 59/161 137/375 |
| 4,927,181 | A | * | 5/1990 | Ciotola | F16L 55/175 138/99 |
| 5,009,737 | A | * | 4/1991 | Lescaut | B29C 55/24 156/264 |
| 5,662,974 | A | | 9/1997 | Andrenacci et al. | |
| 6,065,781 | A | * | 5/2000 | Titus | B29C 65/505 285/288.1 |
| 6,355,318 | B1 | * | 3/2002 | Tailor | B29C 66/49 138/109 |
| 6,402,201 | B1 | * | 6/2002 | Pool | B29C 44/1242 285/45 |
| 8,840,977 | B2 | * | 9/2014 | Tailor | F16L 13/004 285/21.2 |

FOREIGN PATENT DOCUMENTS

| | | |
|---|---|---|
| WO | 9801697 | 1/1998 |
| WO | 2009027686 | 3/2009 |

OTHER PUBLICATIONS

Search Report and Written Opinion dated May 18, 2012 for Netherland Application No. NL2007693.

* cited by examiner

PIPELINE UNIT

This application is the National Stage of International Application No. PCT/NL2012/050756, filed Oct. 31, 2012, which claims benefit of Netherlands Patent Application No. 2007693, filed Nov. 1, 2011, and which claims benefit of U.S. Provisional Application No. 61/553,563, filed Oct. 31, 2011 and U.S. Provisional Application No. 61/565,104, filed Nov. 30, 2011.

FIELD OF THE INVENTION

The present invention relates to an assembly of two pipeline units and a method of producing an assembly of two pipeline units.

DISCUSSION OF THE PRIOR ART

Pipelines are used in the oil and gas industry for the transportation of hydrocarbons. When hydrocarbon deposits are found under the sea floor, pipelines are often laid on the sea floor for transporting the hydrocarbons to a storage or production facility.

Pipelines are typically formed from many pipeline units that are welded end-to-end before they are laid. Pipeline units comprise a pipe member which are often manufactured from carbon steel and are prone to corrosion if they are not protected from the sea water. The pipe members are therefore coated with protective material, the type may be determined by the operating environment. Polyolefins, such as polypropylene (PP), are widely used as a coating material. Also other materials are used.

The outer pipe surface of the pipe member may first be provided with a layer of an anti corrosion agent such as an epoxy, that is applied either in liquid or powdered form. Fusion Bonded Epoxy (FBE) is widely used. Subsequently, the pipe coating made from for example a polyolefin material is provided on the anti corrosion layer. An adhesion promoter may be applied on top of the FBE to enhance bonding to the material of the pipe coating.

The pipe coating may be build up with layers of polyolefin material. For example, a first layer of polypropylene is applied over the anti corrosion layer and the adhesion promoter. A second thin layer of polypropylene is applied on top, with a third layer of thicker, extruded polypropylene over the second layer. Two additional layers of polypropylene may for example be applied. When insulation is needed, further modified layers can be added, with a final layer of hardened polypropylene to protect the insulation as well as the pipe member.

The pipe ends of the pipe members are not covered by the pipe coating. The pipe coating extends along a length of the pipe member and ends at a first coating end face located at a distance from the first pipe end and at a second coating end face located at a distance from the second pipe end.

To produce a pipeline, the pipe ends of the pipeline units are joined together, for example by welding. Other joining techniques may be used. The pipeline units are jointed together at a pipe joint, such that the coating end faces of the pipeline units are located at opposite sides of the pipe joint.

After the joining of the pipeline units, the pipe ends and the pipe joint are covered by a joint coating. As the pipeline units are joined together in the field before they are laid on the seabed or reeled onto a reel for transport to a laying vessel, the coating of the pipe joints is performed in the field as well. This means that said operations may take place outdoors, such as on a quay or off-shore, for example on a pipeline laying vessel.

A common technique used for the production of the joint coating is injection moulding, such as Injection Moulded Polypropylene (IMPP), and Injection Moulded Polyurethane (IMPU). The opposite coating end faces of the two joined pipeline units are usually heated, and the pipe joint is enclosed with a mould that defines a cavity between the uncoated pipe ends and the pipe joint, the two opposite coating end faces of the pipeline units and the mould. Molten polypropylene (IMPP) or pre-set polyurethane (IMPU) is then injected into the cavity where it cools and solidifies. A layer of an anti corrosion agent may be provided on the uncoated pipe ends and the pipe joint before the joint coating is applied.

A disadvantage of the use of polypropylene for the joint coating is that the process is time consuming, labour intensive and expensive. A relatively long time is required for the polyolefin pipe coating to sufficiently bond to the injection moulded polypropylene and before it is deemed strong enough to accommodate bending without separating and exposing the outer pipe surface. It is very important to secure an impermeable bond between the pipe coating and the joint coating to properly protect the pipe member during use.

Another disadvantage with IMPP relates to the need to heat the coating end faces of the polyolefin pipe coating prior to fitting the mould over the pipe joint and injecting the molten polypropylene. Heating the coating end faces sufficiently requires a difficult and time consuming operation.

A disadvantage of IMPU is that it is very difficult to obtain a secure bonding with for example a polyolefin material of the pipe coating. The bonding which can be obtained in the field is not strong enough to provide a securely bonded joint coating. When the bonding is not secure, water may reach the pipe member. Pipelines often transport hydrocarbons at elevated temperatures, the outer pipe surface of pipe member will therefore also be at elevated temperatures. Hydrolysis can occur in polyurethane at the interface known as the 'hot-wet interface' when the water comes into contact with the polyurethane which is at an elevated temperature due to the temperature of the pipe member. The operable lifespan of the underwater pipeline may be as long as 20 years. During this time the pipeline experiences elevated pressures depending on the depth to which it is laid. This increases the risk for hydrolysis, leading to the decay of the polyurethane and exposing the pipe wall. The onset of hydrolysis for polyurethane occurs at a temperature of around 85 degrees Celsius. Therefore if polyurethane is used as a joint coating, it is imperative that it is bonded securely with the pipe coating.

SUMMARY OF THE INVENTION

The assembly according the invention comprises two pipeline units, wherein each pipeline unit comprises a pipe member and a pipe coating surrounding the pipe member, which pipe member comprises a pipe end, and which pipe coating extends along a length of the pipe member and ends at a coating end face located at a distance from the pipe end, the pipe ends of the pipeline units are joined together at a pipe joint, such that the coating end faces of the pipeline units are located at opposite sides of the pipe joint, a joint coating is provided at the pipe joint, the joint coating surrounds the pipe joint, is attached to the two opposite coating end faces of the pipeline units and is made from a material comprising a silicone.

When compared with a joint coating produced with IMPP, the production of the joint coating made of a material comprising silicone can occur faster. The material comprising silicone hardens faster than the polypropylene material. This means that the assembly will need less time to be ready to be processed further, such as rolling over rolling boxes and/or bending during a reeling operation.

On site, the time taken between joint coatings is referred to as the 'cycle time'. The use of the material comprising silicone for the production of the joint coating makes it possible to reduce the cycle time. Reducing the cycle time is highly desired to reduce operation costs, especially offshore where vessel running costs are very high.

The equipment required to produce the joint coating made of a material comprising silicone tends to be much smaller when compared with IMPP. This results in a saving of valuable space at the location where the operations takes place, for example the deck of a pipeline laying vessel.

Compared with polypropylene, the silicone material shrinks less. Shrinkage of the material of the joint coating can result in cracks. Due to this, water may enter the joint coating via the cracks and ultimately reach the pipe members.

The exothermic reaction of the material comprising silicone of the joint coating is less when compared with a joint coating produced by IMPU. Therefore, the material comprising silicone shrinks less than the polyurethane material. This reduces the risk that water enters the joint coating via cracks in the joint coating and reaches the pipe members.

The onset of hydrolysis for the material comprising silicone occurs at a temperature (around 160 degrees Celsius) which is much higher than for polyurethane material. The risk for hydrolysis of the material of the joint coating is therefore lower when the material comprising silicone is used.

In an embodiment of the assembly, the joint coating is made from a silicone material.

In an embodiment of the assembly, the joint coating is provided by an injection moulding process.

In an embodiment of the assembly, the material of the joint coating comprises a silicone resin.

In an embodiment of the assembly, the material of the joint coating is made from a silicone resin.

In an embodiment of the assembly, the silicone resin is a reinforced silicone resin.

In an embodiment of the assembly, the reinforced silicone resin comprises reinforcement particles.

In an embodiment of the assembly, the reinforcement particles comprise glass particles.

In an embodiment of the assembly, the material of the pipe coating comprises a polyolefin.

In an embodiment of the assembly, the material of the pipe coating comprises a thermoplastic polyolefin.

In an embodiment of the assembly, the material of the pipe coating comprises a polyolefin elastomer.

In an embodiment of the assembly, the material of the pipe coating comprises polypropylene.

In an embodiment of the assembly, the material of the pipe coating comprises polyethylene.

In an embodiment of the assembly, the material of the pipe coating comprises polystyrene.

In an embodiment of the assembly, the material of the pipe coating comprises polymethylpentene.

In an embodiment of the assembly, the pipe coating is made from a polyolefin material.

In an embodiment of the assembly, the pipe coating is made from a thermoplastic polyolefin material.

In an embodiment of the assembly, the pipe coating is made from a polyolefin elastomeric material.

In an embodiment of the assembly, the pipe coating is made from a polypropylene material.

In an embodiment of the assembly, the pipe coating is made from a polyethylene material.

In an embodiment of the assembly, the pipe coating is made from a polystyrene material.

In an embodiment of the assembly, the pipe coating is made from a polymethylpentene material.

In an embodiment of the assembly, the pipe member comprises an outer pipe surface and an anti corrosion agent is provided on the outer pipe surface of the pipe ends and the pipe joint.

In an embodiment of the assembly, the anti corrosion agent is an epoxy.

In an embodiment of the assembly, the anti corrosion agent is a fusion bonded epoxy or liquid epoxy.

In an embodiment of the assembly, the anti corrosion agent comprises aluminium.

In an embodiment of the assembly, the anti corrosion agent is made from aluminium.

In an embodiment of the assembly, the anti corrosion agent is a thermal sprayed aluminium.

The invention further relates to a method of producing an assembly of two pipeline units, the method comprising the steps of:
  providing two pipeline units, wherein each pipeline unit comprises a pipe member and a pipe coating surrounding the pipe member, which pipe member comprises a pipe end, and which pipe coating extends along a length of the pipe member and ends at a coating end face located at a distance from the pipe end,
  joining the pipe ends of the pipeline units together at a pipe joint, such that the coating end faces of the pipeline units are located at opposite sides of the pipe joint,
  providing a joint coating made from a material comprising silicone at the pipe joint, such that the joint coating surrounds the pipe members and is attached to the two opposite coating end faces of the pipeline units.

In an embodiment of the method, the method comprises making the joint coating from a silicone material.

In an embodiment of the method, the method comprises providing the joint coating by an injection moulding process.

In an embodiment of the method, the method comprises making the joint coating of a material comprising a silicone resin.

In an embodiment of the method, the method comprises making the joint coating from a silicone resin.

In an embodiment of the method, the silicone resin is a reinforced silicone resin.

In an embodiment of the method, the reinforced silicone resin comprises reinforcement particles.

In an embodiment of the method, the reinforcement particles comprise glass particles.

In an embodiment of the method, the method comprises providing pipeline units wherein the material of the pipe coating comprises a polyolefin.

In an embodiment of the method, the method comprises providing pipeline units wherein the material of the pipe coating comprises a thermoplastic polyolefin.

In an embodiment of the method, the method comprises providing pipeline units wherein the material of the pipe coating comprises a polyolefin elastomer.

In an embodiment of the method, the method comprises providing pipeline units wherein the material of the pipe coating comprises polypropylene.

In an embodiment of the method, the method comprises providing pipeline units wherein the material of the pipe coating comprises polyethylene.

In an embodiment of the method, the method comprises providing pipeline units wherein the material of the pipe coating comprises polystyrene.

In an embodiment of the method, the method comprises providing pipeline units wherein the material of the pipe coating comprises polymethylpentene.

In an embodiment of the method, the method comprises providing pipeline units wherein the pipe coating is made from a polyolefin material.

In an embodiment of the method, the method comprises providing pipeline units wherein the pipe coating is made from a thermoplastic polyolefin material.

In an embodiment of the method, the method comprises providing pipeline units wherein the pipe coating is made from a polyolefin elastomeric material.

In an embodiment of the method, the method comprises providing pipeline units wherein the pipe coating is made from a polypropylene material.

In an embodiment of the method, the method comprises providing pipeline units wherein the pipe coating is made from a polyethylene material.

In an embodiment of the method, the method comprises providing pipeline units wherein the pipe coating is made from a polystyrene material.

In an embodiment of the method, the method comprises providing pipeline units wherein the pipe coating is made from a polymethylpentene material.

In an embodiment of the method, the method comprises providing an anti corrosion agent on the outer pipe surfaces of the pipe ends and the pipe joint before the joint coating is provided.

In an embodiment of the method, the provided anti corrosion agent is an epoxy.

In an embodiment of the method, the provided anti corrosion agent is a fusion bonded epoxy or liquid epoxy.

In an embodiment of the method, the provided anti corrosion agent comprises aluminium.

In an embodiment of the method, the provided anti corrosion agent is made from aluminium.

In an embodiment of the method, the provided anti corrosion agent is a thermal sprayed aluminium.

In an embodiment of the method, the providing of the joint coating comprises the steps of:
a. cleaning the coating end faces,
b. subjecting the coating end faces to a heat source,
c. treating the coating end face with a plasma jet,
d. applying a silicone primer to the coating end faces, and
e. forming the joint coating.

In an embodiment of the method, the heat source is a hot air blower.

In an embodiment of the method, step e comprises the sub steps of:
placing a mould around the pipe joint and in contact with the pipe coatings of the pipeline units such that the pipe joint is enclosed by the mould defining a cavity between the pipe ends and pipe joint, the opposite coating end faces and the mould,
injecting the material of the joint coating into the cavity, where it subsequently cools and solidifies,
removing the mould from the pipeline units.

In an embodiment of the method, the silicone primer is in step d also applied on the pipe ends and the pipe joint. In an embodiment of the method, the production of the pipeline units is performed on-shore and the providing the joint coating on the joined pipeline units off-shore.

In an embodiment of the method, the method comprises providing the joint coating on the joined pipeline units on a vessel, such as a pipeline laying vessel.

In an embodiment of the method, the method comprises providing the joint coating on the joined pipeline units on a vessel, such as a pipeline laying vessel.

The invention further relates to the use of the assembly according to the invention.

Figure 2:
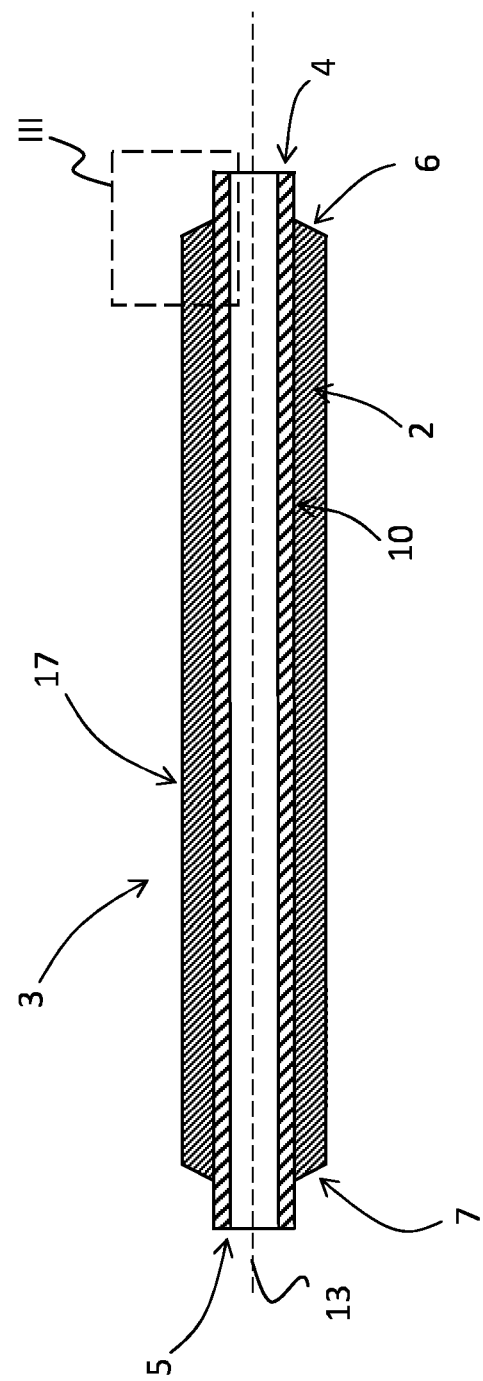
Figure 3:
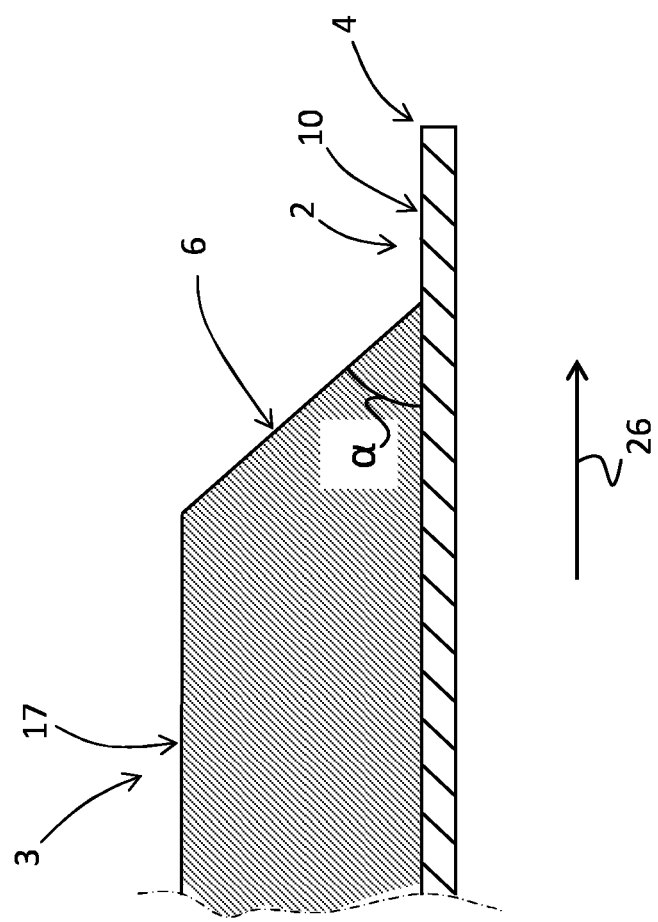
Figure 4:
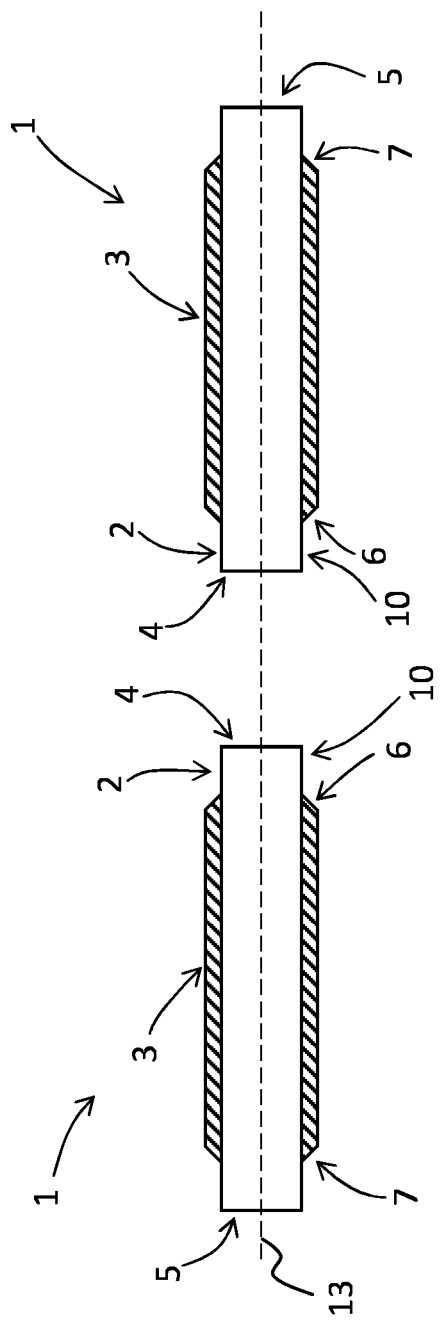
Figure 5:
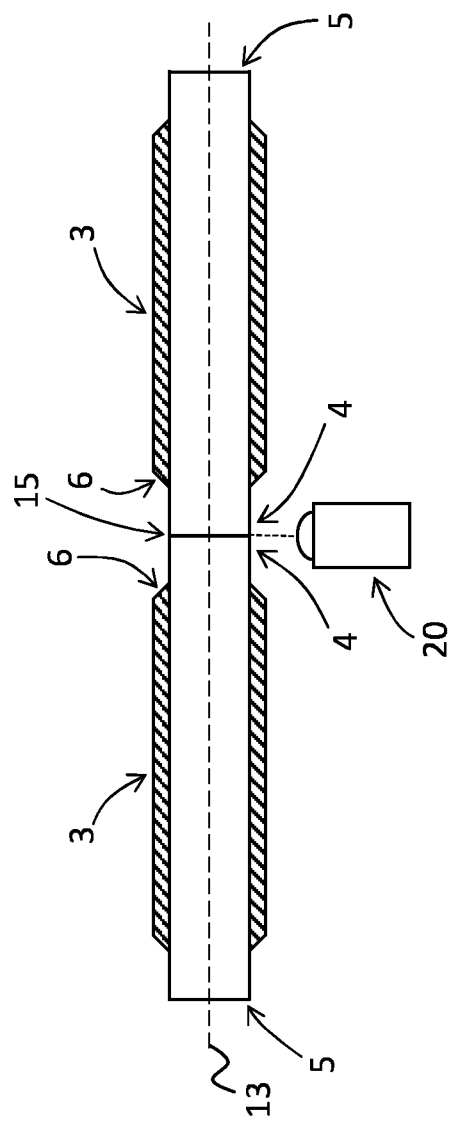
Figure 6:
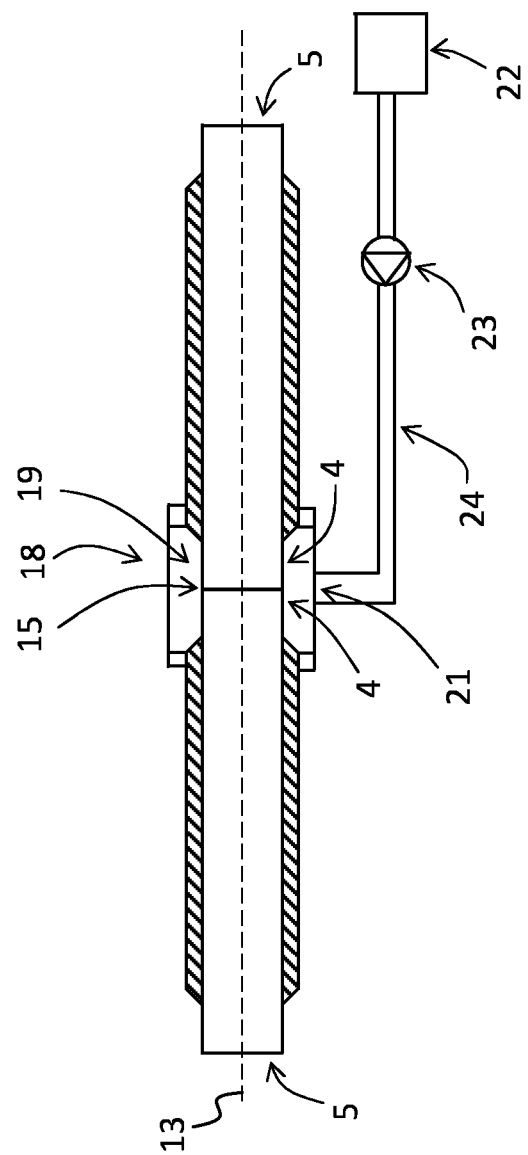
Figure 7:
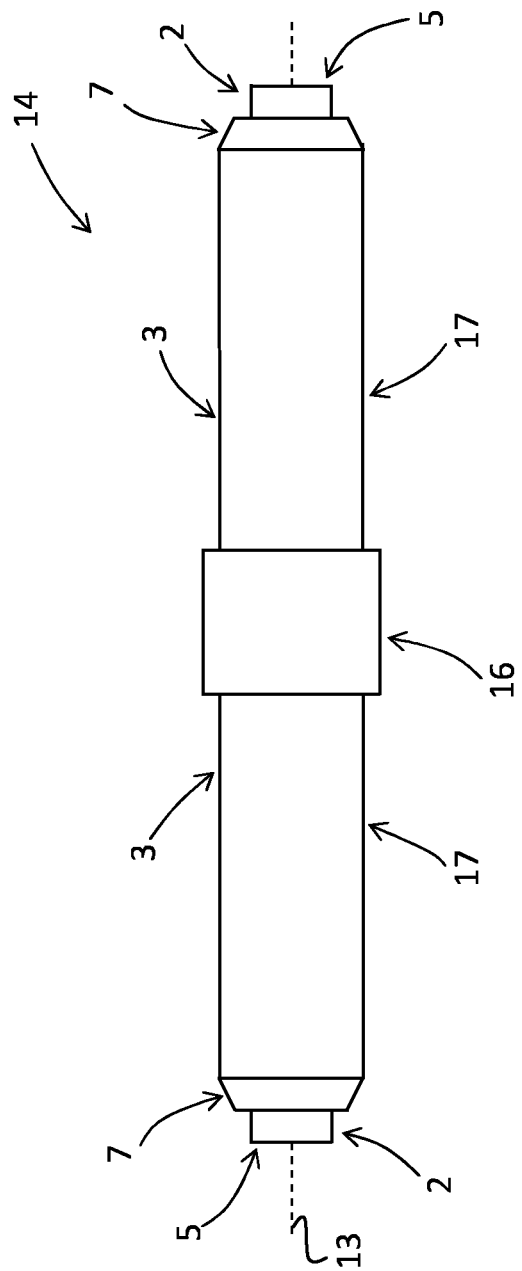
Figure 8:
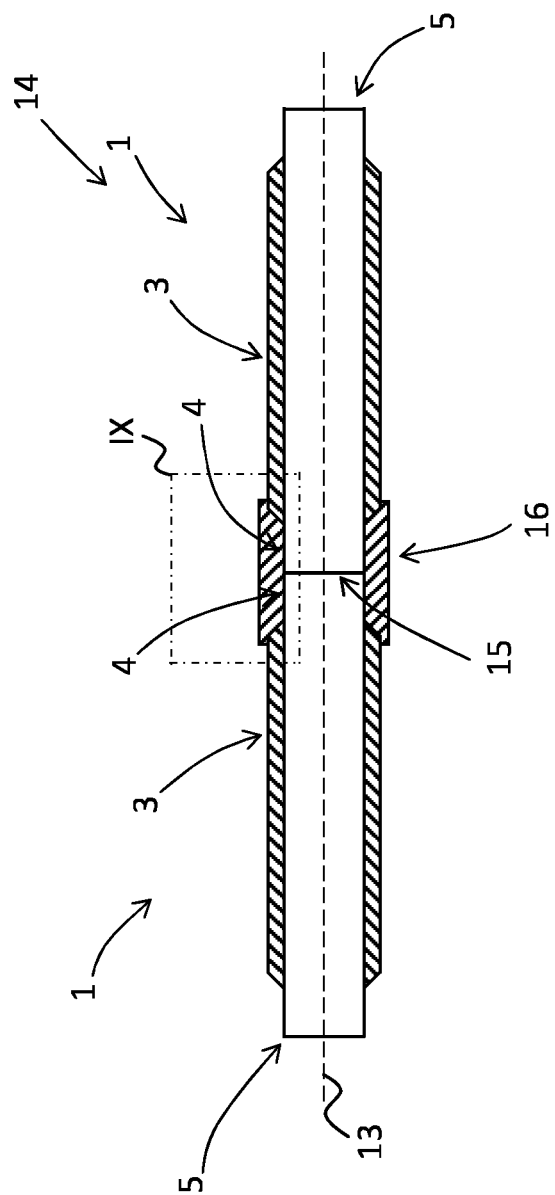
Figure 9:
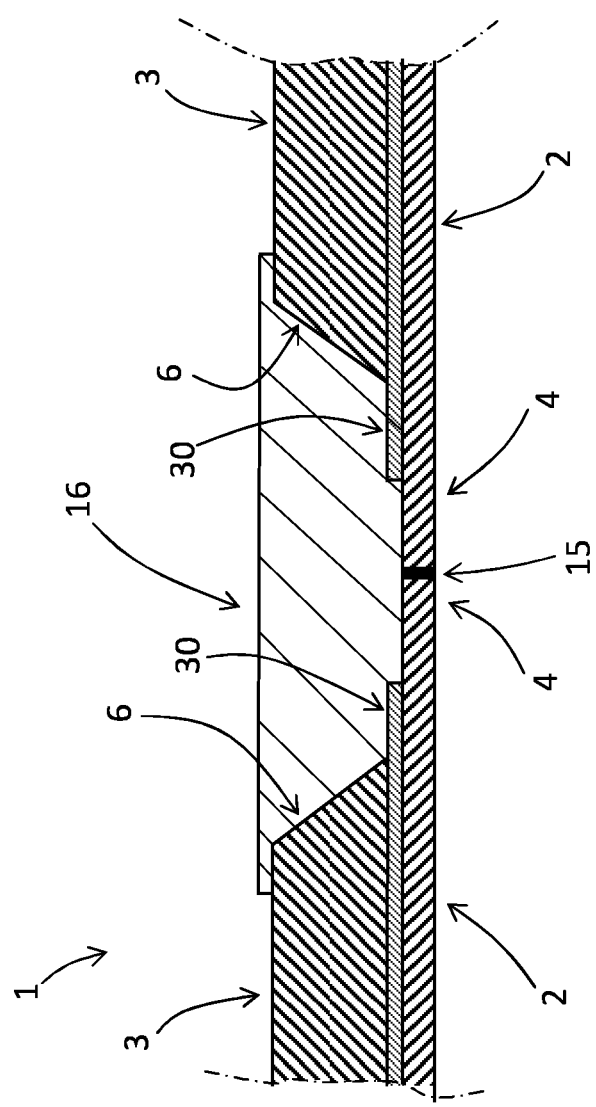
Figure 10:
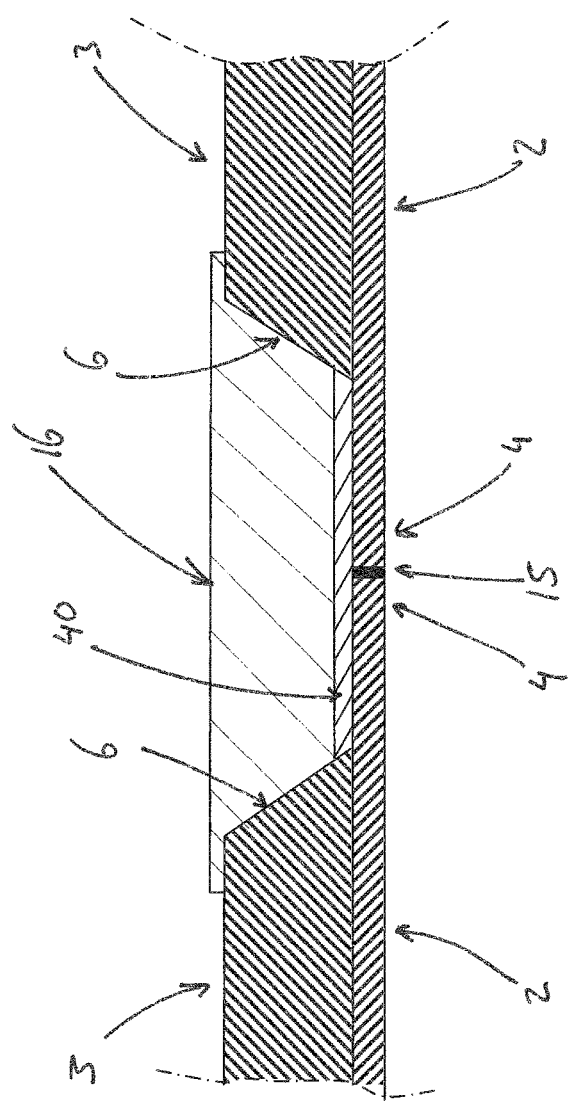
Figure 11:
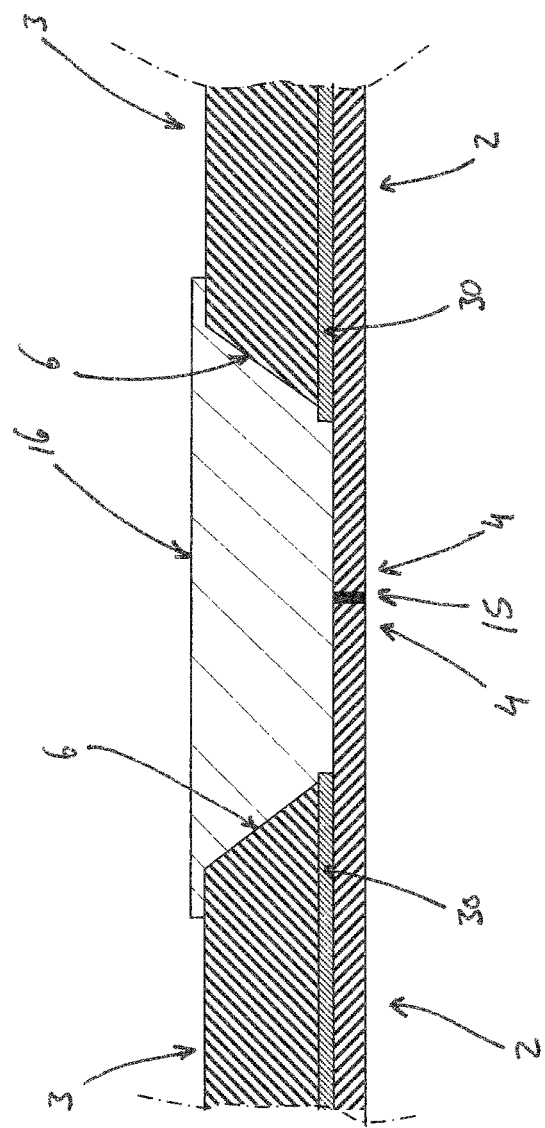
Figure 12:
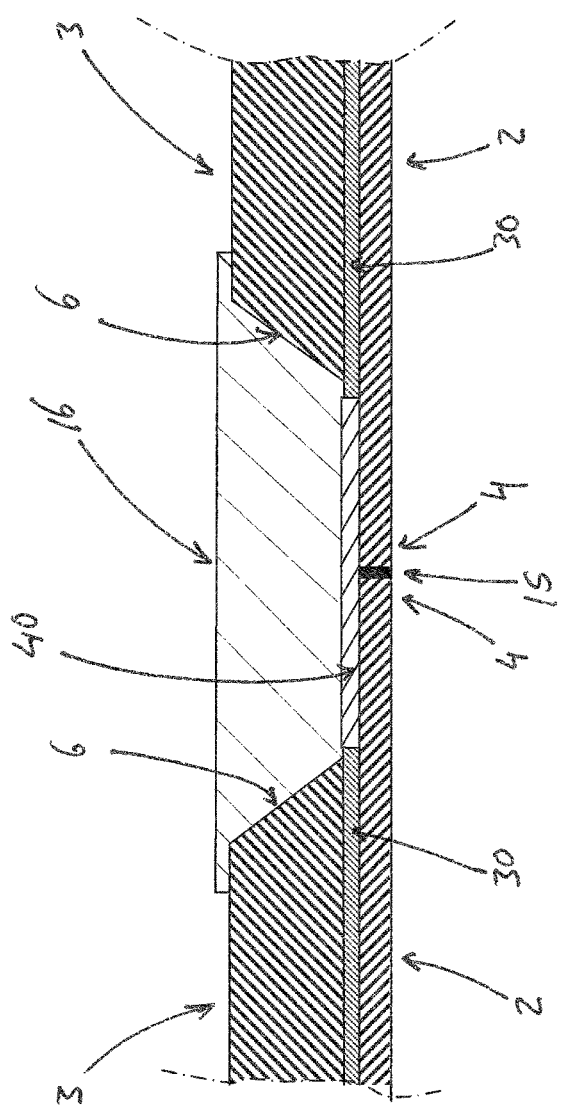

Embodiments of the assembly and method according the invention will be described by way of example only, with reference to the accompanying schematic drawings in which corresponding reference symbols indicate corresponding parts, and in which:

FIG. 1 schematically shows a side view of a pipeline unit,

FIG. 2 schematically shows a cross sectional view of the pipeline unit of FIG. 1, FIG. 3 schematically shows an enlarged view of part III of FIG. 2, the FIGS. 4-6 schematically show an embodiment of the method of producing an assembly of two pipeline as shown in FIG. 1, FIG. 7 schematically shows a side view of the assembly of two pipeline unit as produced by the method shown in the FIG. 4-6, FIG. 8 schematically shows a cross sectional view of the assembly of FIG. 7, FIG. 9 schematically shows an enlarged view of part IX of FIG. 8, FIG. 10 schematically shows the assembly of FIG. 9, wherein a layer of an anti corrosion agent is provided on the first pipe ends and the pipe joint, FIG. 11 schematically shows the assembly of FIG. 9, wherein each pipeline unit is provided with a layer of an anti corrosion agent, and FIG. 12 schematically shows the assembly of FIG. 9, wherein a layer of an anti corrosion agent is provided on the first pipe ends and the pipe joint and each pipeline unit is provided with a layer of an anti corrosion agent.

DETAILED DESCRIPTION OF THE INVENTION

FIG. 1 shows a side view of a pipeline unit 1. The pipeline unit 1 comprises a pipe member 2 and a pipe coating 3 surrounding the pipe member 2. The pipe member 2 comprises a first pipe end 4 and a second pipe end 5. The pipe coating 3 extends along a length of the pipe member 2 and ends at a first coating end face 6 located at a distance from the first pipe end 4 and at a second coating end face 7 located at a distance from the second pipe end 5. The pipe coating 3 extends along the pipe member 2 from the first coating end face 6 to the second coating end face 7. The pipe coating 3 is made from a polyolefin material. In other examples, the pipe coating 3 is made from a different material.

FIG. 2 shows a cross sectional view of the pipeline unit of FIG. 1 and FIG. 3 shows an enlarged view of part III of FIG. 2. The cross section of the FIGS. 2 and 3 is along the longitudinal pipe axis 13 of the pipeline unit 1.

The pipe member 2 comprises an outer pipe surface 10. The first and second coating end faces 7, 8 surround the pipe member 2 and extends transverse to the outer pipe surface 10.

The pipe coating 3 is made from a polypropylene material. In other examples, the pipe coating 3 is made from a different polyolefin material.

The pipe member 2 defines a longitudinal pipe axis 13. The pipe coating 3 comprises an outer coating surface 17. The first and second coating end faces 6, 7 extend between the outer pipe surface 10 and the outer coating surface 17 at an angle ($\alpha$) between 20 and 50 degrees from the longitudinal pipe axis 13. In other examples, the first and second coating end faces 6, 7 extend between the outer pipe surface 10 and the outer coating surface 17 at an angle ($\alpha$) between 10 and 90 degrees from the longitudinal pipe axis 13. In other examples, the first and second coating end faces 6, 7 extend between the outer pipe surface 10 and the outer coating surface 17 at an angle ($\alpha$) between 0 and 90 degrees from the longitudinal pipe axis 13.

The FIGS. 4-6 shows an embodiment of the method of producing an assembly of two pipeline units as shown in FIG. 1.

In FIG. 4, two pipeline units 1 as shown in FIG. 1 are provided. The pipeline units 1 are shown in a cross sectional view along the longitudinal pipe axis 13. The pipeline units 1 are aligned.

In FIG. 5, the first pipe ends 4 of the pipeline units 1 are joined together at a pipe joint 15, such that the first coating end faces 6 of the pipeline units 1 are located at opposite sides of the pipe joint 15. The pipeline units 1 are joined by a welding device 20. In other examples, a different type of joining technique is used.

In FIG. 6, a joint coating 16 made from a silicone material is provided at the pipe joint 15, such that the joint coating 16 surrounds the pipe members 2 and is attached to the two opposite first coating end faces 6 of the pipeline units 1. In other examples the joint coating 16 is made from a material comprising silicone.

The joint coating 16 is produced by injection moulding of the silicone material. A mould 18 is placed around the pipe joint 15 and in contact with the pipe coating 3. The pipe joint 15 is enclosed by the mould 18 that defines a cavity 19 between the uncoated first pipe ends 4 and the pipe joint 15, the two opposite first coating end faces 6 and the mould 18. Pre-set silicone is then injected via an inlet 21 provided in the mould 18 into the cavity 19 where it subsequently cools and solidifies. After that, the mould 18 is removed from the pipeline units 1.

Before the joint coating is formed, the following steps may be performed:
cleaning the coating end faces,
subjecting the coating end faces to a heat source,
treating the coating end face with a plasma jet, and
applying a silicone primer to the coating end faces.

The coating end faces are cleaned to remove contamination. The coating end faces may be cleaned by using a lint-free cloth, alcohol, or a chemical cleaner.

The heat source may melt the coating end faces at least partly. The heat source may be a hot air blower.

The plasma jet activates the coating end faces and tends to create a better adhesion with the material of the joint coating or the primer.

The silicone primer may be applied by spraying or wiping it on the surfaces. The silicone primer may also be applied on the pipe ends and the pipe joint. A pump 23 is used to pump the silicone material from an silicone supply 22 via supply channel 24 connected with the inlet 21 into the cavity 19 of the mould 18. A layer of an anti corrosion agent may be provided on the first pipe ends 4 and the pipe joint 15 before the joint coating 16 is applied.

The joining of the pipeline units 1 and the placing the joint coating 16 can be performed in the field, such as on a quay or off-shore, as for example on a pipeline laying vessel.

The FIGS. 7-9 show the assembly of two pipeline unit as produced by the method shown in the FIG. 4-6.

The assembly 14 comprises two pipeline units 1 as shown in FIG. 1. The first pipe ends 4 of the pipeline units 1 are joined together at a pipe joint 15, such that the first coating end faces 6 of the pipeline units 1 are located at opposite sides of the pipe joint 15. A joint coating 16 is provided at the pipe joint 15. The joint coating 16 is made from a silicone material, surrounds the pipe joint 15, and is attached to the two opposite first coating end faces 6 of the pipeline units 1. The joint coating 16 extends over the full distance between the two opposite first coating end faces 6 of the pipeline units 1.

FIG. 10 shows the assembly of FIG. 9, wherein the first pipe ends 4 and the pipe joint 15 are provided with a layer of an anti corrosion agent 40, also referred to as an anti corrosion joint layer 40. The anti corrosion joint layer 40 fully surrounds the first pipe ends 4 and the pipe joint 15. The anti corrosion joint layer 40 extends over the full distance between the opposite first coating end faces 6. The anti corrosion joint layer 40 is placed in contact with both first coating end faces 6.

FIG. 11 shows the assembly of FIG. 9, wherein each pipeline unit 1 is provided with a layer of an anti corrosion agent 30, also referred to as an anti corrosion pipe layer 30. The anti corrosion pipe layer 30 extends along the pipe member 2 and ends at a distance from the first and second pipe end 4, 5. The anti corrosion pipe layer 30 fully surrounds the pipe member 2.

FIG. 12 shows the assembly of FIG. 9, wherein the first pipe ends 4 and the pipe joint 15 are provided with an anti corrosion joint layer 40 and each pipeline unit 1 is provided with an anti corrosion pipe layer 30. The anti corrosion joint layer 40 fully surrounds the first pipe ends 4 and the pipe joint 15. The anti corrosion pipe layer 30 fully surrounds the pipe member 2. The anti corrosion joint layer 40 extends over the full distance between the opposite anti corrosion pipe layers 30. The anti corrosion joint layer 40 is placed in contact with both anti corrosion pipe layers 30.

In other examples of the assembly, the anti corrosion joint layer 40 extends over the full distance between the opposite first coating end faces 6. In said situation, the anti corrosion joint layer 40 is placed in contact with both first coating end faces.

The following clauses provide a further description of the pipeline unit according to the invention, the assembly according to the invention, the method according to the invention, and the use of the pipeline unit and the assembly according to the invention.

1. Assembly of two pipeline units, wherein;
each pipeline unit comprises a pipe member and a pipe coating surrounding the pipe member, which pipe member comprises a pipe end, and which pipe coating extends along a length of the pipe member and ends at a coating end face located at a distance from the pipe end,
the pipe ends of the pipeline units are joined together at a pipe joint, such that the coating end faces of the pipeline units are located at opposite sides of the pipe joint, a joint coating is provided at the pipe joint,
the joint coating surrounds the pipe joint, is attached to the two opposite coating end faces of the pipeline units and is made from a material comprising a silicone.

2. Assembly according to clause 1, wherein the joint coating is made from a silicone material.

3. Assembly according to clause 1 or 2, wherein the joint coating is provided by an injection moulding process.

4. Assembly according to any of the preceding clauses, wherein the material of the joint coating comprises a silicone resin.

5. Assembly according to any of the preceding clauses, wherein the material of the joint coating is made from a silicone resin.

6. Assembly according to clause 4 or 5, wherein the silicone resin is a reinforced silicone resin.

7. Assembly according to clause 6, wherein the reinforced silicone resin comprises reinforcement particles.

8. Assembly according to clause 7, wherein the reinforcement particles comprise glass particles.

9. Assembly according to any of the preceding clauses, wherein the material of the pipe coating comprises a polyolefin.

10. Assembly according to any of the preceding clauses, wherein the material of the pipe coating comprises a thermoplastic polyolefin.

11. Assembly according to any of the preceding clauses, wherein the material of the pipe coating comprises a polyolefin elastomer.

12. Assembly according to any of the preceding clauses, wherein the material of the pipe coating comprises polypropylene.

13. Assembly according to any of the preceding clauses, wherein the material of the pipe coating comprises polyethylene.

14. Assembly according to any of the preceding clauses, wherein the material of the pipe coating comprises polystyrene.

15. Assembly according to any of the preceding clauses, wherein the material of the pipe coating comprises polymethylpentene.

16. Assembly according to any of the clauses 1-8, wherein the pipe coating is made from a polyolefin material.

17. Assembly according to any of the clauses 1-8, wherein the pipe coating is made from a thermoplastic polyolefin material.

18. Assembly according to any of the clauses 1-8, wherein the pipe coating is made from a polyolefin elastomeric material.

19. Assembly according to any of the clauses 1-8, wherein the pipe coating is made from a polypropylene material.

20. Assembly according to any of the clauses 1-8, wherein the pipe coating is made from a polyethylene material.

21. Assembly according to any of the clauses 1-8, wherein the pipe coating is made from a polystyrene material.

22. Assembly according to any of the clauses 1-8, wherein the pipe coating is made from a polymethylpentene material.

23. Assembly according to any of the preceding clauses, wherein the joint coating extends over the full distance between the two opposite coating end faces of the pipeline units.

24. Assembly according to any of the preceding clauses, wherein the pipe member comprises an outer pipe surface.

25. Assembly according to clause 24, wherein an anti corrosion agent is provided on the outer pipe surface of the pipe ends and the pipe joint.

26. Assembly according to clause 25, wherein the anti corrosion agent is an epoxy.

27. Assembly according to clause 25, wherein the anti corrosion agent is a fusion bonded epoxy or liquid epoxy.

28. Assembly according to clause 25, wherein the anti corrosion agent comprises aluminium.

29. Assembly according to clause 25, wherein the anti corrosion agent is made from aluminium.

30. Assembly according to clause 25, wherein the anti corrosion agent is a thermal sprayed aluminium.

31. Assembly according to any of the clauses 24-30, wherein in each pipeline unit the coating end face surrounds the pipe member and extends transverse to the outer pipe surface.

32. Assembly according to any of the preceding clauses, wherein in each pipeline unit the pipe member defines a longitudinal pipe axis and the pipe coating comprises an outer coating surface.

33. Assembly according to clause 32, wherein in each pipeline unit the coating end face extends between the outer pipe surface and the outer coating surface at an angle between 0 and 90 degrees from the longitudinal pipe axis.

34. Assembly according to clause 32, wherein in each pipeline unit the coating end face extends between the outer pipe surface and the outer coating surface at an angle between 10 and 90 degrees from the longitudinal pipe axis.

35. Assembly according to clause 32, wherein in each pipeline unit the coating end face extends between the outer pipe surface and the outer coating surface at an angle between 20 and 50 degrees from the longitudinal pipe axis.

36. Assembly according to any of the clauses 33-35, wherein in each pipeline unit the angle of the coating end face varies.

37. Method of producing an assembly of two pipeline units, the method comprising the steps of:
providing two pipeline units, wherein each pipeline unit comprises a pipe member and a pipe coating surrounding the pipe member, which pipe member comprises a pipe end, and which pipe coating extends along a length of the pipe member and ends at a coating end face located at a distance from the pipe end,
joining the pipe ends of the pipeline units together at a pipe joint, such that the coating end faces of the pipeline units are located at opposite sides of the pipe joint,
providing a joint coating made from a material comprising silicone at the pipe joint, such that the joint coating surrounds the pipe members and is attached to the two opposite coating end faces of the pipeline units.

38. Method according to clause 37, wherein the method comprises making the joint coating from a silicone material.

39. Method according to clause 37 or 38, wherein the method comprises providing the joint coating by an injection moulding process.

40. Method according to any of the clauses 37-39, wherein the method comprises making the joint coating of a material comprising a silicone resin.

41. Method according to any of the clauses 37-40, wherein the method comprises making the joint coating from a silicone resin.

42. Method according to clause 40 or 41, wherein the silicone resin is a reinforced silicone resin.

43. Method according to clause 42, wherein the reinforced silicone resin comprises reinforcement particles.

44. Method according to clause 43, wherein the reinforcement particles comprise glass particles.

45. Method according to any of the clauses 37-44, wherein the method comprises providing pipeline units wherein the material of the pipe coating comprises a polyolefin.

46. Method according to any of the clauses 37-45, wherein the method comprises providing pipeline units wherein the material of the pipe coating comprises a thermoplastic polyolefin.

47. Method according to any of the clauses 37-46, wherein the method comprises providing pipeline units wherein the material of the pipe coating comprises a polyolefin elastomer.

48. Method according to any of the clauses 37-47, wherein the method comprises providing pipeline units wherein the material of the pipe coating comprises polypropylene.

49. Method according to any of the clauses 37-48, wherein the method comprises providing pipeline units wherein the material of the pipe coating comprises polyethylene.

50. Method according to any of the clauses 37-49, wherein the method comprises providing pipeline units wherein the material of the pipe coating comprises polystyrene.

51. Method according to any of the clauses 37-50, wherein the method comprises providing pipeline units wherein the material of the pipe coating comprises polymethylpentene.

52. Method according to any of the clauses 37-44, wherein the method comprises providing pipeline units wherein the pipe coating is made from a polyolefin material.

53. Method according to any of the clauses 37-44, wherein the method comprises providing pipeline units wherein the pipe coating is made from a thermoplastic polyolefin material.

54. Method according to any of the clauses 37-44, wherein the method comprises providing pipeline units wherein the pipe coating is made from a polyolefin elastomeric material.

55. Method according to any of the clauses 37-44, wherein the method comprises providing pipeline units wherein the pipe coating is made from a polypropylene material.

56. Method according to any of the clauses 37-44, wherein the method comprises providing pipeline units wherein the pipe coating is made from a polyethylene material.

57. Method according to any of the clauses 37-44, wherein the method comprises providing pipeline units wherein the pipe coating is made from a polystyrene material.

58. Method according to any of the clauses 37-44, wherein the method comprises providing pipeline units wherein the pipe coating is made from a polymethylpentene material.

59. Method according to any of the clauses 37-58, wherein the method comprises providing the joint coating such that the joint coating extends over the full distance between the two opposite coating end faces of the pipeline units.

60. Method according to any of the clauses 37-59, wherein the pipe member of the provided pipeline units comprises an outer pipe surface.

61. Method according to clause 60, wherein the method comprises providing an anti corrosion agent on the outer pipe surfaces of the pipe ends and the pipe joint before the joint coating is provided.

62. Method according to clause 61, wherein the provided anti corrosion agent is an epoxy.

63. Method according to clause 61, wherein the provided anti corrosion agent is a fusion bonded epoxy or liquid epoxy.

64. Method according to clause 61, wherein the provided anti corrosion agent comprises aluminium.

65. Method according to clause 61, wherein the provided anti corrosion agent is made from aluminium.

66. Method according to clause 61, wherein the provided anti corrosion agent is a thermal sprayed aluminium.

67. Method according to any of the clauses 60-66, wherein the coating end face of the provided pipeline units surrounds the pipe member and extends transverse to the outer pipe surface.

68. Method according to any of the clauses 37-67, wherein the pipe members of the provided pipeline units define a longitudinal pipe axis and the pipe coating comprises an outer coating surface.

69. Method according to clause 68, wherein the coating end face of the provided pipeline units extends between the outer pipe surface and the outer coating surface at an angle between 0 and 90 degrees from the longitudinal pipe axis.

70. Method according to clause 68, wherein the coating end face of the provided pipeline units extends between the outer pipe surface and the outer coating surface at an angle between 10 and 90 degrees from the longitudinal pipe axis.

71. Method according to clause 68, wherein the coating end face of the provided pipeline units extends between the outer pipe surface and the outer coating surface at an angle between 20 and 50 degrees from the longitudinal pipe axis.

72. Method according to any of the clauses 69-71, wherein the angle of the coating end face of the provided pipeline units varies.

73. Method according to any of the clauses 37-72, wherein the providing of the joint coating comprises the steps of:
 a. cleaning the coating end faces,
 b. subjecting the coating end faces to a heat source,
 c. treating the coating end face with a plasma jet,
 d. applying a silicone primer to the coating end faces, and
 e. forming the joint coating.

74. Method according to clause 73, wherein step e comprises the sub steps of:
 placing a mould around the pipe joint and in contact with the pipe coatings of the pipeline units such that the pipe joint is enclosed by the mould defining a cavity between the pipe ends and pipe joint, the opposite coating end faces and the mould,
 injecting the material of the joint coating into the cavity, where it subsequently cools and solidifies,
 removing the mould from the pipeline units.

75. Method according to clause 73 or 74, wherein in step d the silicone primer is also applied on the pipe ends and the pipe joint.

76. Method according to any of the clauses 37-75, wherein the production of the pipeline units is performed on-shore and the method comprises providing the joint coating on the joined pipeline units off-shore.

77. Method according to any of the clauses 37-76, wherein the method comprises providing the joint coating on the joined pipeline units on a vessel, such as a pipeline laying vessel.

78. Use of an assembly according to any of the clauses 1-36.

It will be apparent to those skilled in the art that various modifications can be made to the assembly and method without departing from the scope of the invention.

The invention claimed is:

1. An assembly of two pipeline units, wherein:
   each pipeline unit comprises a pipe member and a pipe coating surrounding the pipe member, which pipe member comprises a pipe end, and which pipe coating extends along a length of the pipe member and ends at a coating end face located at a distance from the pipe end,
   the pipe ends of the pipeline units are joined together at a pipe joint, such that the coating end faces of the pipeline units are located at opposite sides of the pipe joint,
   a joint coating is provided at the pipe joint,
   the joint coating surrounds the pipe joint, is attached to the two opposite coating end faces of the pipeline units and is made from a material comprising a solidified silicone resin.

2. The assembly according to claim 1, wherein the joint coating is made from a silicone material.

3. The assembly according to claim 1, wherein the material of the joint coating is made from a silicone resin.

4. The assembly according to claim 1, wherein the material of the pipe coating comprises a polyolefin.

5. The assembly according to claim 1, wherein the pipe coating is made from a polypropylene material.

6. The assembly according to claim 1, wherein the pipe member comprises an outer pipe surface and an anti corrosion agent is provided on the outer pipe surface of the pipe ends and the pipe joint.

7. The assembly according to claim 6, wherein the anti corrosion agent is a fusion bonded epoxy or liquid epoxy.

8. The assembly according to claim 6, wherein the anti corrosion agent comprises aluminium.

* * * * *